(12) United States Patent
Song et al.

(10) Patent No.: US 11,932,736 B2
(45) Date of Patent: Mar. 19, 2024

(54) CARBON FIBER REINFORCED THERMOPLASTIC SHEETS FOR EFFICIENT MICROWAVE HEATING WITH DISPERSED WAVY CARBON NANOTUBES

(71) Applicant: Toyota Motor Engineering & Manufacturing North America, Inc., Plano, TX (US)

(72) Inventors: Yuyang Song, Ann Arbor, MI (US); Umesh N. Gandhi, Farmington Hills, MI (US); Piran R. Kidambi, Nashville, TN (US)

(73) Assignees: Toyota Motor Engineering & Manufacturing North America, Inc., Plano, TX (US); Vanderbilt University, Nashville, TN (US)

(*) Notice: Subject to any disclaimer, the term of this patent is extended or adjusted under 35 U.S.C. 154(b) by 339 days.

(21) Appl. No.: 17/307,611

(22) Filed: May 4, 2021

(65) Prior Publication Data

US 2022/0356312 A1    Nov. 10, 2022

(51) Int. Cl.
*C08J 5/04* (2006.01)
*D01F 8/18* (2006.01)

(52) U.S. Cl.
CPC ............... *C08J 5/042* (2013.01); *C08J 5/041* (2013.01); *C08J 5/043* (2013.01); *C08J 5/045* (2013.01); *D01F 8/18* (2013.01); C08J 2323/06 (2013.01); C08J 2323/12 (2013.01); C08J 2325/06 (2013.01); C08J 2333/12 (2013.01); C08J 2353/02 (2013.01); C08J 2367/03 (2013.01); C08J 2369/00 (2013.01); C08J 2371/02 (2013.01); D10B 2101/122 (2013.01); D10B 2321/10 (2013.01)

(58) Field of Classification Search
CPC ... C08J 5/041; C08J 5/042; C08J 5/043; C08J 5/045; C08J 2323/06; C08J 2323/01
USPC .......................................................... 524/496
See application file for complete search history.

(56) References Cited

U.S. PATENT DOCUMENTS

| 5,804,801 A | 9/1998 | Lauf et al. |
| 10,919,760 B2* | 2/2021 | Lin ..................... H01L 23/3737 |

OTHER PUBLICATIONS

Hassan, A.M. et al., "Enhancing CF/PEEK composites by CF decoration with polyimide and loosely-packed CNT arrays", Composites Part A: Applied Science and Manufacturing, vol. 127 (2019) (Abstract only).

Köehler, T. et al., "Development of glass fibre reinforced composites using microwave heating technology" IOP Conf. Series: Materials Science and Engineering 254 (2017) 7 pages.

* cited by examiner

*Primary Examiner* — Edward J Cain

(74) *Attorney, Agent, or Firm* — Christopher G. Darrow; Darrow Mustafa PC

(57) ABSTRACT

A non-woven carbon fiber reinforced thermoplastic (CFRTP) composite object is formed by the variable frequency microwave (VFM) irradiation of a mixed fiber sheet of thermoplastic fibers, carbon fibers and wavy carbon nanotubes (CNTs). The mixed fiber sheets are prepared from a slurry of the thermoplastic fibers, carbon fibers, and wavy CNTs such that the wavy CNTs contact the carbon fibers and thermoplastic fibers. Upon irradiation with VFM radiation, the wavy CNTs generate heat and transfer the heat to the thermoplastic fibers, causing melting of the thermoplastic to form the matrix of the CFRTP composite object. The mixed fiber sheets can be combined alone or with other sheets to form laminar composites that are molded into objects and heated by VFM irradiation.

8 Claims, 2 Drawing Sheets

CARBON FIBER REINFORCED THERMOPLASTIC SHEETS FOR EFFICIENT MICROWAVE HEATING WITH DISPERSED WAVY CARBON NANOTUBES

TECHNICAL FIELD

The present disclosure generally relates to carbon fiber composites that are efficiently heated using variable frequency microwave techniques.

BACKGROUND

Carbon fiber reinforced thermoplastics (CFRTPs) are composites that are increasingly being used in products where a high strength to weight ratio is desirable and particularly when a high stiffness is advantageous. These CFRTPs have a polymer matrix that is a thermoplastic rather than the more typical thermoset of carbon fiber reinforced polymers (CFRPs). Thermosets are typically easier to fabricate but lack any ability for repair or recycling, which has made CFRTPs increasingly more attractive to manufacturers of parts for aerospace, automotive, and high-performance sport equipment, including bicycles, boats, protective equipment, and racquets. Forming a CFRTP can be difficult with thermoplastics as the effective melting of the thermoplastic and wetting of the carbon fiber with the thermoplastic can be problematic.

The carbon fiber is a good thermal conductor relative to the thermoplastic, but typically a layer of woven carbon fiber is placed between layers of thermoplastics which are then pressed together while heating. To increase the efficiency of the process, methods, such as ultrasonic vibration, while pressing have been examined. The deposition of loosely packed, but not dense carbon nanotubes (CNTs) has been examined, typically with the inclusion of a sizing agent on the surface of woven carbon fibers. The CNTs have very high thermal conductivity and promote the melting of the thermoplastic in the vicinity of the carbon fibers while being pressed together. CNTs have been shown to enhance interfacial properties between thermoplastics and carbon fibers. This enhancement of the interfaces has been promoted using ultrasonic methods and laser irradiation. Non-woven CFRTP have been examined where carbon fibers, CNTs, and up to 50 weight percent nylon 6 fibers are combined and placed between layers of nylon 6. The methods used to generate these CFRTPs have introduced cost and time barriers to their introduction into their manufacture for typical applications of CFRTPs. As the source and type of CNTs selected, their mode of combination with thermoplastics and carbon fibers, efficient methods to CFRTPs parts are needed to advance the inclusion of CFRTP in a practical manufacture setting.

Variable frequency microwave (VFM) processing of materials uses a broad frequency range to allow heating of materials not commonly associated with microwave heating. The ability for the microwaves to generate heat at carbon structures holds promise to process composites. The formation of CFRTP with CNTs, carbon fibers, and commodity thermoplastics is desirable.

SUMMARY

Disclosed, in various non-limiting embodiments, are repairable non-woven carbon fiber reinforced thermoplastic (CFRTP) composites that combine a thermoplastic matrix with carbon fibers and wavy carbon nanotubes (CNTs), where the wavy carbon nanotubes are well dispersed through the thermoplastic matrix and contact the carbon fibers. The CFRTP composites can be used to generate and transfer heat to the thermoplastic matrix or its precursor thermoplastic fiber upon variable frequency microwave (VFM) irradiation of the CFRTP composite, or for producing the CRFTP composite. In addition to the ability to rapidly form and shape the CFRTP composite, some forms of the composite can be repaired. The wavy CNTs are included at a level of about 0.2 to about 2 weight percent. The carbon fibers are included at about 20 to about 40 percent carbon fibers, and the thermoplastic matrix is about 60 to about 80 percent of the composite. The CFRTP composite is formed as a sheet that can be further processed with other carbon fiber sheets, thermoplastic sheets, and other layers of materials for modification of the properties of the non-woven CFRTP composite sheets. The wavy CNTs readily bridge the carbon fibers and penetrate the matric in a quasi-regular manner, where the wavy CNTs are infused and form a short concentration gradient. The gradient of CNTs in the matrix generally varies from a high density to a lower density along micro-channels of thermoplastic within the matrix that are characterized by a portion of the thickness of thermoplastic fibers that were employed to generate the composites.

One embodiment, provided herein, is a method to form a CFRTP composite by the VFM irradiation of a fiber suspension that includes carbon fibers, thermoplastic fibers, and wavy carbon nanotubes. The wavy carbon nanotubes, once dispersed from their synthesized aggregate, are not prone to aggregate or align with the fibers, but rather more homogeneously disperse and bridge between carbon fibers and the thermoplastic fibers. The wavy CNTs are microwave active, readily heating when irradiated, and because of their high thermal conductivity, they rapidly transfer the heat to the thermoplastic fibers and carbon fibers. The melting of the thermoplastics under VFM radiation is rapid and uniform and not from the surface as with traditional CFRTP composite forming methods. The fiber suspension in the form of a sheet can be inserted between other sheets or layers and a laminar composite can be form that includes the CFRTP composite sheets and curing of the laminar composite occurs upon irradiating with a VFM source. The mixed fiber sheet(s) and optionally sheets and/or layers of other composition, can be held within a compression device that is configured to apply pressure to the sheet(s) while undergoing VFM irradiation. The VFM irradiation can occur within an oven or using a directable VFM source that is incorporated within a press or mold to form an object or can be directed at a surface of the mixed fiber sheet to form or directed at the CFRTP composite object to reform or repair the CFRTP composite object. The time required for heating and the heating profile is defined by the amount of wavy CNTs the intensity of the microwave radiation, but in some cases can be reduced to as little as a few minutes, for example two to five minutes. Heat radiates from the wavy CNTs rather than from the surface as in more common forms of heating. As the thermoplastic is highly divided and contacting the wavy CNTs on a large portion of their surface, because of the enormous surface provided by the wavy CNTs, heat transfer from the wavy CNTs and melting of the thermoplastic fibers is rapid.

In one embodiment, provided herein, objects comprising CFRTP composites are rigid and very light in weight, relative to an equivalent metal or even glass fiber composites object. The composites include at least one non-woven CFRTP composite sheet that has wavy CNTs well dispersed and bridging across carbon fibers, and infused into the thermoplastic matrix. A micro-channel of thermoplastic streams through the CFRTP sheet and is highly decorated with wavy CNTs on the periphery of the micro-channels derived from the melting thermoplastic fibers, where melting is promoted by the heated wavy CNTs. The objects can be laminar composites where these non-woven CFRTP composite sheets with wavy CNTs are layered with other sheets of woven carbon fibers, thermoplastics, woven glass fibers, metal foils, woven aramid fibers, woven metal fibers, elastomers, thermoplastic elastomers, thermosetting resins and/or any other sheet that can be employed to form a desired laminate composite.

These and other features of the CFRTP composites and their preparation will become apparent from the following detailed description when read in conjunction with the figures and examples, which are exemplary, not limiting.

BRIEF DESCRIPTION OF THE DRAWINGS

For a better understanding of the processes and devices having, with regard to the particular variations and examples discussed herein, reference is made to the accompanying figures, in which.

Figure 1:
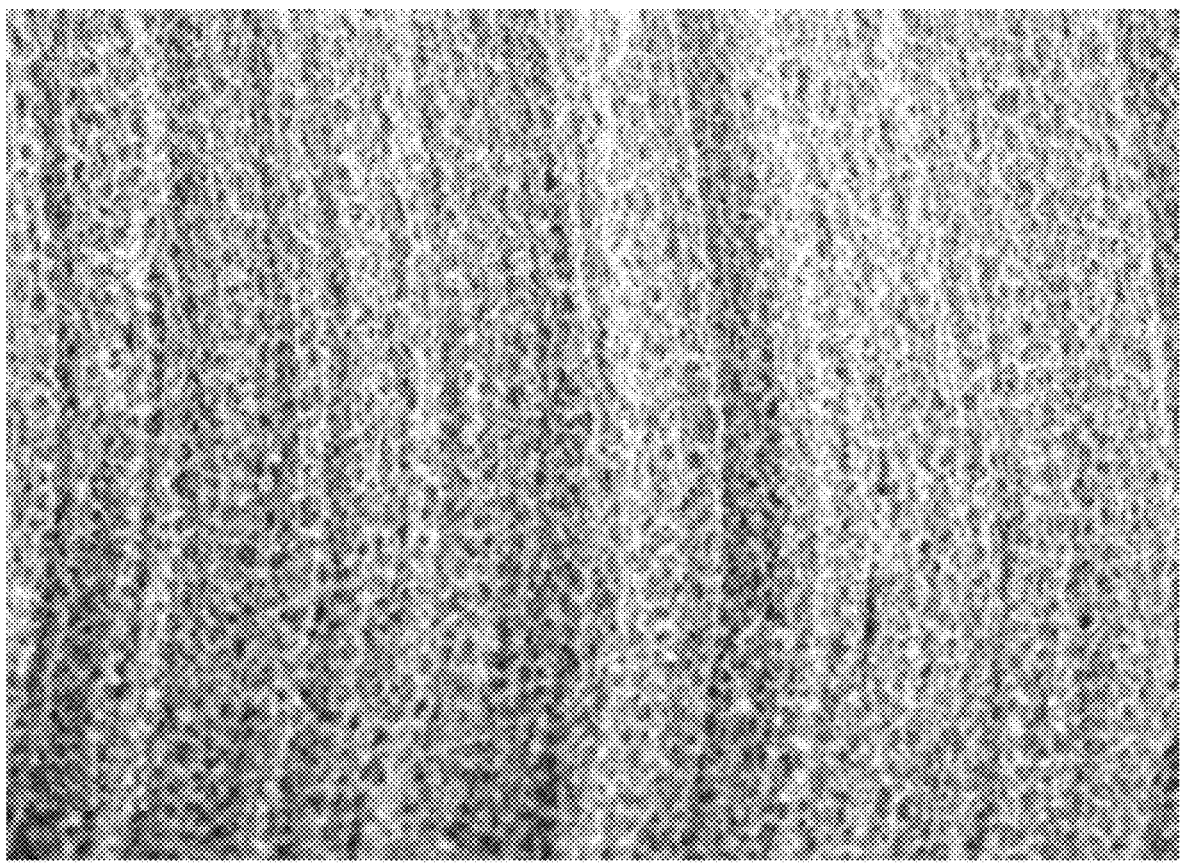
FIG. 1 shows an SEM image of wavy CNTs.

It should be noted that the figures set forth herein is intended to exemplify the general characteristics of the methods and devices among those of the present technology, for the purpose of the description of certain aspects. The figures may not precisely reflect the characteristics of any given aspect and are not necessarily intended to define or limit specific embodiments within the scope of this technology.

DETAILED DESCRIPTION

The present disclosure provides a microwavable heatable carbon fiber reinforced thermoplastic (CFRTP) composite that combines carbon fibers with thermoplastic fibers and wavy carbon nanotubes (CNTs) to yield a non-woven composite with a homogeneous distribution of carbon fibers bridged by the wavy CNTs. The carbon fibers may be included at about 20 to about 40 weight percent carbon fibers, and the thermoplastic matrix may be included at about 60 to about 80 weight percent of the composite. The wavy CNTs can be included from about 0.2 to about 2.0 weight percent of the composite. Below about 60 weight percent thermoplastic fiber included to form the matrix, the amount of void volume remaining after heating, even under pressure, may lead to a CFRTP composite of insufficient strength for some applications. The wavy CNTs necessarily bridge between the various carbon and thermoplastic fibers rather than aligning along individual carbon fibers. The bridging wavy CNTs readily heat under microwave irradiation and rapidly transfer that heat to the carbon fibers and thermoplastic fibers. Because of this effective heating, the thermoplastic fibers readily melt. The melting plastic more effectively wets the surface of the CNTs and carbon fibers, with some infusion of the wavy CNTs into a portion of the thermoplastic fiber. This yields microchannels of thermoplastic that may be continuous or non-continuous, and derived from the core of the thermoplastic fibers that were employed for the formation of the CFRTP composite. In this manner, a well dispersed carbon filler within a thermoplastic matrix is generated into a form for use in any form that the preheated fiber mixture can be shaped.

In various embodiments, the microwave heatable non-woven CFRTP formed as a sheet can be stacked or otherwise combined with sheets of woven carbon fibers, woven glass fibers, woven aramid fibers, thermoplastics, thermoplastic-elastomers, elastomers, metal foils, and/or resins, where the thermoplastic may be of the same composition or of a different composition as that in the non-woven CFRTP sheet. Woven sheets can be impregnated with resins, such as epoxy resins. The wavy CNTs of the non-woven sheet allow the microwave heating of that sheet for thermoplastic meting for a facile laminating with the other sheets of a laminar composite in which one or more of these sheets are included. The ability for microwaves to generate heat in multiple layers of the laminate structure is conducive to rapid composite formation. By including these additional sheets, the laminar composite can be engineered to have improved rigidity, strength, resistance to delamination, impact resistance, vibration dampening, shielding properties or any other property, which allows the composites properties to be designed to meet the demands of the object constructed from the laminar composite.

In one embodiment, a method is provided for the preparation of a non-woven CFRTP composite sheet where wavy CNTs are combined with carbon fibers and thermoplastic fibers as an aqueous fiber suspension or as a fiber suspension in any other liquid that can be readily separated from the resulting homogeneous mixture, including the wavy CNTs, carbon fibers, and thermoplastic fibers. Other additives can be included in the aqueous suspensions, such as surfactants or other fillers including glass fibers; metal filings, fibers, or needles; non-meltable spun polymer fibers, such as Kevlar, Nomex, or other highly conjugated aramid polymers; plant based natural fibers, or elastomer particles and thermosetting resins, such as epoxy resins. The suspension, a slurry, is mixed and agitated for the dispersion of the components within the suspension in a manner that that the filtration or settling and decantation of the aqueous solution or non-aqueous solution from the homogeneously combined solids results in a wet composite of the wavy CNTS, carbon fibers, and thermoplastic fibers. Because of their wavy geometry, disengagement of CNT from the aggregated form resulting from their synthesis readily occurs relative to their straight CNT equivalents during mixing with relatively straight thermoplastic fibers and carbon fibers for the formation of the composite. Removal of the residual water or non-aqueous solvent can be carried out by reducing pressure or increasing temperature. Any temperature increase is generally below the melting temperature of the thermoplastic fibers, or the final removal of the solvent can coincide with the heating by microwave irradiation to form the non-woven composite sheet. The microwave irradiation can be to a sheet that has been compressed under pressure or irradiation can occur during the application of pressure. Pressure can be applied one or more times by pressing, rolling, or any other method before or during irradiation. Pressure can be from essentially no pressure to multi-ton pressures depending upon the densities targeted. The microwave irradiation can be to the non-woven CFRTP composite sheet under vacuum to promote wetting of the wavy CNTs and carbon fibers by the melted thermoplastic to result more completely in a continuous interface of thermoplastic and carbon components in the non-woven composite. Any application of vacuum can be before or carried out in coordination with the pressing of the non-woven composite into a sheet.

In one embodiment, the non-woven mixed fiber sheet that was formed from the slurry, but not yet consolidated by pressing or heating, can be included as one or more layers with one or more other component sheets for the formation of a laminar composite where the layers are pressed together before, during, or immediately after VFM irradiation of the non-woven CFRTP composite mixture. These one or more additional layers can be woven fabrics, thermoplastic sheets, deformable metal foils or sheets, thermoplastic elastomer sheets, elastomer sheets, or any other sheet that is compatible with the intended use of the object ultimately formed from the non-woven CFRTP composite. The microwave heated and consolidated non-woven CFRTP composite layer can transfer heat to adjacent layers to promote any heat transformation desired to result in a particular structural feature. The heating can be controlled by the intensity of the VFM radiation to achieve a desired rate in which the laminating process occurs. For example, one layer can draw heat from the non-woven CFRTP composite layer after irradiation to rapidly cool the composite into a stable part, which can allow a high throughput of the laminar composite including one or more CRFTP composite sheets on a production line for an object or part.

Advantageously, because the matrix of the CFRTP composite sheet is a thermoplastic, a portion can be heated using VFM to bond two CFRTP composite objects together or repair a damaged CFRTP composite object. This capability is useful for CFRTP composite parts for vehicles, where a VFM heated part can be heated to remove cracks or other blemishes that might occur under normal use of from a non-catastrophic collision. While constructing the vehicle, the CFRTP composite part can be heated in the vicinity where two parts are to be joined and the mixing of the thermoplastic melt at their interface can fuse the parts together.

The non-woven CFRTP composite can be formed with nearly any thermoplastic, where the thermoplastic used can be chosen by the requirements of the object to be formed or the conditions that are desirable for the process, including its melting temperature, glass transition temperature, decomposition temperature, and stability under sheer. The thermoplastic can be a homopolymer or copolymer, linear or branched, and of any tacticity or compositional regularity, including a random, block, or gradient copolymer. Some polymer blends can be used as the thermoplastic, for example PPE-polystyrene. Non-limiting examples of thermoplastics that can be used include ABS, Nylon 6-6, Nylon 6, Nylon 12, polycarbonate, polyoxymethylene, PEEK, polyethylene, polypropylene, polystyrene, PVDF, PMMA, PET, and PBT. Compatible thermoplastics can be combined into a single sheet, or non-miscible polymers can be included as individual fibers with an agent, such as a block copolymer of the two polymers to stabilize an interface of an interpenetrating polymer matrix. Thermoplastics that are additionally functionalized or otherwise modified by copolymerization can be spun into fibers for inclusion with non-modified thermoplastic fiber for the formation of the non-woven, CFRTP composite sheets. The carbon fibers can be those commercially available from the carbonization of PAN, rayon, pitch, or any combination thereof.

The wavy CNTs can be prepared using a traditional chemical vapor deposition (CVD) furnace where hydrogen and ethylene are introduced in a controlled fashion at temperatures up to about 1,100° C. The growth of the wavy CNTs is generated on a silicon wafer with a 300 nm thick silicon dioxide layer that was sputter deposited with 10 nm of aluminum oxide. For example, long wavy CNTs are formed under bellowing conditions at 775° C. with flow rates of 50 sccm hydrogen and 20 sccm ethylene for about fifteen minutes. These wavy multiwalled CNTs are shown in FIG. 1.

Figure 2:
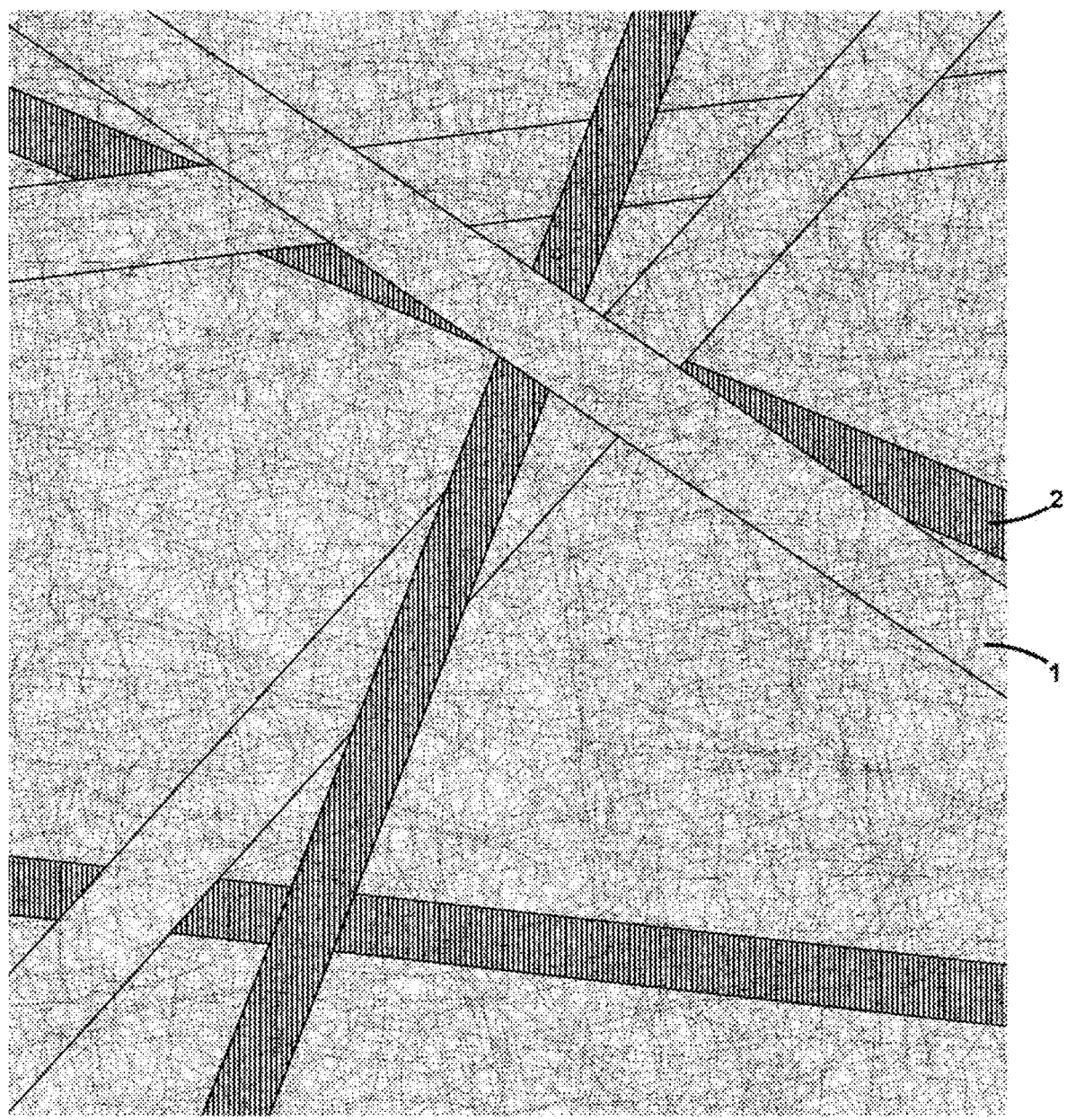
FIG. 2 shows a drawing of a volume element of carbon fibers 2, nylon 6-6 fibers 1 and wavy CNTs suspension for forming the mixed fiber sheet for forming the non-woven CFRTP composite.

Suspensions are prepared using a combined solids of about 20 to about 50 percent carbon fibers, about 50 to about 80 percent thermoplastic fibers, and about 0.2 to about 2 percent wavy CNTs. The solids to solvent mixture can vary from 5 to about 35 percent solids. A small volume element of an aqueous suspension of about 65 weight percent nylon 6,6 fibers 1 of about 10-micron diameter, 34 weight percent carbon fibers 2 of about 6-micron diameter, and about 1 weight percent wavy CNTs, as a fine dispersion of 0.03-micron diameter, where weight percent is that of the total solids in the suspension, is illustrated in FIG. 2. Although at these weight percentages the wavy CNTs are only about 0.8 volume fraction of the solids, with the carbon fibers and nylon 6,6 being about 24 and 75 volume percent, the percent of surface area of the wavy CNTs is about 70 percent. This allows a rapid heat generation and a rapid uniform heat transfer to the carbon fibers and thermoplastic fibers after removal of the water and heating by VFM irradiation. Residual water can be removed using microwave heating of the composites at a frequency and duration that the water boils, but the thermoplastic does not melt and subsequently, VFM irradiation can be to the melting temperature of the thermoplastic. The mixing can be carried out with agitation of any form, including, but not limited to stirrers, sheer mixers, ultrasonic assisted mixers, or any other mode of mixing. Ionic and non-ionic surfactants can be included. When the density of the thermoplastic fibers is greater than that of the water, aqueous solution, or other liquid employed for formation of the suspension, agitation can be stopped, and a settling of the solids can be sufficient to form a mixed sheet of the fibers, where a simple draining or decantation of the water, aqueous solution or other liquid provides a wet mixed fiber sheet. The liquid for formation of the suspension, a second solvent, or a second solution can be added to wash the wet fiber mixture and the wash liquid decanted. Alternatively, the mixed fibers can be filtered from a liquid, and the filter cake washed with the liquid or a second liquid. The resulting wet mixed fiber sheet can be dried by applying heat and/or vacuum to remove residual liquid.

The mixed fiber sheet is heated by VFM radiation directed into the sheet, alone or with a like or different sheet for the formation of a non-woven CFRTP composite object or a laminar composite with other sheets. If a low-density sheet is desired, no compression of the mixed fiber sheet is required, however, compression can be carried out as desired to provide an intermediate or finished object with a desired density and composition. The low-density CFRTP composite part may be one where there is no compression of the mixed fiber sheet before VFM irradiation to melt and consolidate the thermoplastic fibers into the continuous matrix with void volumes resulting from those void volumes in the mixed fiber sheet, but not necessarily of the same shape number and distribution. Additionally, a foaming agent can be included into the thermoplastic fibers or as an additive, where forming the thermoplastic fibers upon heating. The foamed CFRTP composite sheet may provide a low-density sheet for a sound or vibration insulator with good strength and other properties resulting from the CFRTP composite's reinforcement provided by the carbon fibers and CNTs. The VFM radiation can be performed on compressed CFRTP composite sheets or laminates with the sheets or with irradiation of the mixed fiber sheet while under compression by a plate or irradiation can be applied while compression is being introduced by rollers to achieve a dense sheet or laminate composite. In this manner, CFRTP composites and CFRTP laminar composites in the form of a continuous sheet can be formed, cut, and used for subsequent molding into parts, where the heating during molding of the parts can be by any mode. Because of the presence of the very high thermal conductivity CNTs the duration of heating required to distribute the heating into and out of the part during molding is lower for any mode of heating. However, the VFM irradiation generates the heat in all CFRTP composite sheet layers of the laminar composite. The wavy CNTs having a low probability of aligning on a single carbon fiber or thermoplastic fiber and more readily bridge across carbon fibers and thermoplastic fibers and reach a percolation threshold where heat can be transferred throughout the dimensions of the CFRTP composite sheet.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A method of preparing a CFRTP composite object, the method comprising:
   suspending a plurality of thermoplastic fibers, a plurality of carbon fibers, and a plurality of wavy CNTs in a solvent or solution;
   filtering or settling the plurality of thermoplastic fibers, the plurality of carbon fibers, and the plurality of wavy CNTs to form a mixed fiber sheet;
   forming a shaped mixed fiber sheet object comprising at least one of the mixed fiber sheet; and
   irradiating the mixed fiber sheet object using variable frequency microwave (VFM) radiation to form the CFRTP composite object.

2. The method according to claim 1, wherein the thermoplastic fibers comprise at least one of: ABS, Nylon 6-6, Nylon 6, Nylon 12, polycarbonate, polyoxymethylene, PEEK, polyethylene, polypropylene, polystyrene, PVDF, PMMA, PET, and PBT.

3. The method according to claim 1, wherein the wavy CNTs are multiwall CNTs.

4. The method according to claim 1, wherein the solvent is water, or the solution is an aqueous solution.

5. The method according to claim 1, wherein irradiation is within a VFM oven or by a directable VFM source.

6. The method according to claim 1, further comprising drying the mixed fiber sheet or the mixed fiber sheet object.

7. The method according to claim 1, wherein forming or irradiating further comprises applying pressure to mold the CFRTP composite object.

8. The method according to claim 1, wherein the shaped mixed fiber sheet object includes at least one additional sheet selected from a woven carbon fiber sheet, a woven glass fiber sheet, a woven aramid fiber sheet, a woven metal fiber sheet, a thermoplastic sheet, a thermoplastic elastomer sheet, a metal foil, and a thermosetting resin sheet, wherein the CFRTP composite object is a laminar composite.

* * * * *